(12) United States Patent
Otto

(10) Patent No.: US 9,749,084 B2
(45) Date of Patent: Aug. 29, 2017

(54) METHOD FOR TEMPORARILY BLOCKING INCOMING AND OUTGOING WIRELESS COMMUNICATION FOR A MOBILE PHONE

(71) Applicant: Kevin Otto, Milwaukee, WI (US)

(72) Inventor: Kevin Otto, Milwaukee, WI (US)

( * ) Notice: Subject to any disclaimer, the term of this patent is extended or adjusted under 35 U.S.C. 154(b) by 0 days.

(21) Appl. No.: 15/402,053

(22) Filed: Jan. 9, 2017

(65) Prior Publication Data
US 2017/0201342 A1    Jul. 13, 2017

Related U.S. Application Data

(60) Provisional application No. 62/276,620, filed on Jan. 8, 2016.

(51) Int. Cl.
*H04K 3/00* (2006.01)
*H04M 1/725* (2006.01)

(52) U.S. Cl.
CPC ........ *H04K 3/415* (2013.01); *H04M 1/72536* (2013.01)

(58) Field of Classification Search
CPC ................................ H04K 3/415; H04K 3/45
USPC ........... 455/1, 418, 410, 569.2, 569.1, 67.11, 455/41.1, 41.2
See application file for complete search history.

(56) References Cited

U.S. PATENT DOCUMENTS

| | | | |
|---|---|---|---|
| 8,897,822 B2 * | 11/2014 | Martin | H04W 4/12 455/410 |
| 9,137,352 B2 | 9/2015 | Otto | |
| 2013/0149990 A1 | 6/2013 | Otto | |
| 2015/0099457 A1 * | 4/2015 | Moran | H04K 3/415 455/1 |
| 2016/0044155 A1 * | 2/2016 | Reese | H04M 1/72577 455/418 |

* cited by examiner

*Primary Examiner* — John J Lee

(57) ABSTRACT

A method for temporarily blocking incoming and outgoing wireless communication is provided with a mobile-phone disrupting unit and a motion sensor in a vehicle. A current speed of the vehicle is monitored with the motion sensor and then a plurality of communication disrupting signals is emitted by the mobile-phone disrupting unit if the current speed of the vehicle exceeds a minimum-speed threshold. When the current speed drops to the minimum-speed threshold or a lower speed, the process of emitting the plurality of disrupting signals is disabled so that the user can utilize the mobile phone. The mobile-phone disrupting unit and the motion sensor is either operatively integrated into the vehicle or housed within a self-containing enclosure.

10 Claims, 5 Drawing Sheets

---

Providing the vehicle with an input/output (I/O) user interface, wherein the I/O user interface is electronically connected to the mobile-phone disrupting unit

↓

Receiving a desired value for the minimum-speed threshold through the I/O user interface

↓

Designating the desired value as the minimum-speed threshold with the mobile-phone disrupting unit

METHOD FOR TEMPORARILY BLOCKING INCOMING AND OUTGOING WIRELESS COMMUNICATION FOR A MOBILE PHONE

The current application claims a priority to the U.S. Provisional Patent application Ser. No. 62/276,620 filed on Jan. 8, 2016. The current application is filed on Jan. 9, 2017 while Jan. 8, 2017 was on a weekend.

FIELD OF THE INVENTION

The present invention relates generally to a method and apparatus for temporarily blocking incoming and outgoing communication of a mobile phone that is being used in a car. The present invention intends to aid the driver focus more on driving by blocking any wireless communication that can interfere with driving.

BACKGROUND OF THE INVENTION

Traffic accidents are caused due to a variety of reasons. Drunk driving, distracted drivers, and dangerous road conditions are some of the main reasons for traffic accidents. When considering the number of traffic accidents in the recent past, we can see a significant rise in accidents that could have been prevented if proper measures were taken. Mainly so because much of these accidents were caused by distracted drivers. The rise in the number of deaths/injuries due to distracted drivers emphasizes the need to address the issue immediately.

A driver can be distracted in multiple ways. Eating, drinking, and the use of a mobile phone are some of the main causes that can lead to a driver being distracted. Since many accidents are caused by drivers using their mobile phones while driving, the immediate need to address the issue is clear. Implementing traffic fines is one of the main methods that is being used to address the issue. However, fines have not been proven to be effective as expected. Either the driver pays the fine and repeats the same action or the driver is never fined for the use of a mobile phone. The present invention intends to address the issue by eliminating the possibility to use a mobile phone while driving.

The objective of the present invention is to address the aforementioned issues. More specifically, the present invention completely blocks all sorts of wireless communication so that the driver can focus only on driving. By utilizing the present invention, the safety of the user and other drivers on the road is guaranteed. The present invention can be integrated into a vehicle during the manufacturing process or as an aftermarket product.

DETAIL DESCRIPTIONS OF THE INVENTION

All illustrations of the drawings are for the purpose of describing selected versions of the present invention and are not intended to limit the scope of the present invention.

The present invention introduces a method that can be used to minimize the number of traffic accidents that are caused by drivers distracted by a mobile phone. More specifically, the present invention intends to temporarily block all wireless communication so that the driver is not distracted by a mobile phone while driving.

Figure 1A:
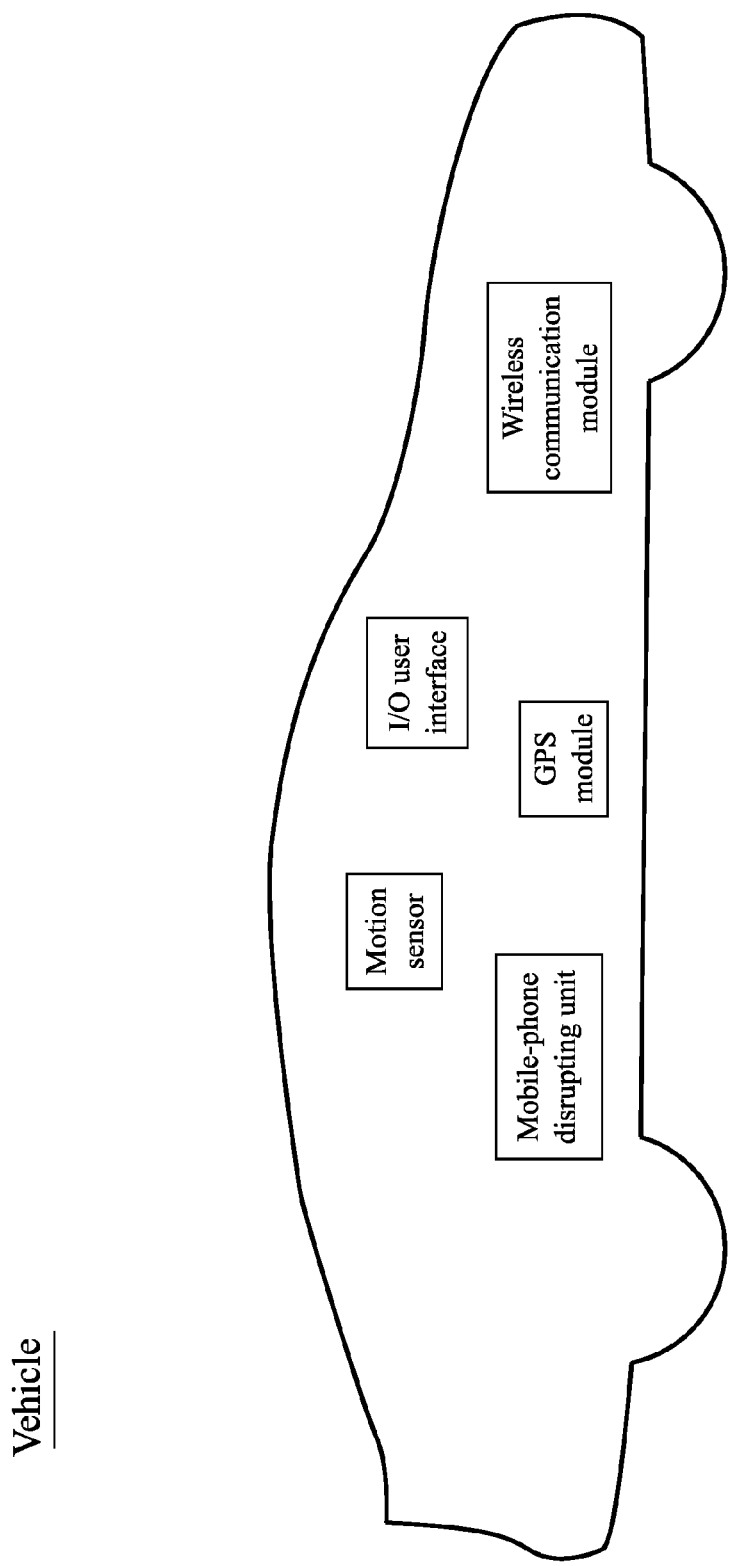
FIG. 1A is a system diagram illustrating the present invention.

As seen in FIG. 1A, the system for present invention is provided with a vehicle that includes a mobile-phone disrupting unit and a motion sensor. The mobile-phone disrupting unit and the motion sensor can be integrated into the vehicle during the manufacturing process of the vehicle or as an aftermarket product. The mobile-phone disrupting unit, which can vary in different embodiments of the present invention, is used to temporarily block all wireless communication of a mobile phone positioned within the vehicle. The mobile-phone disrupting unit can be, but is not limited to, a radio frequency (RF) disruptor. The motion sensor is used to determine the movement of the vehicle. The mobile-phone disrupting unit and the motion sensor together ensure that wireless communication for a mobile phone within the car is disabled when the vehicle is in motion. To do so, the mobile-phone disrupting unit stores a minimum-speed threshold. By storing the minimum-speed threshold, the present invention triggers the mobile-phone disrupting unit when the vehicle reaches the minimum-speed threshold.

Figure 1B:
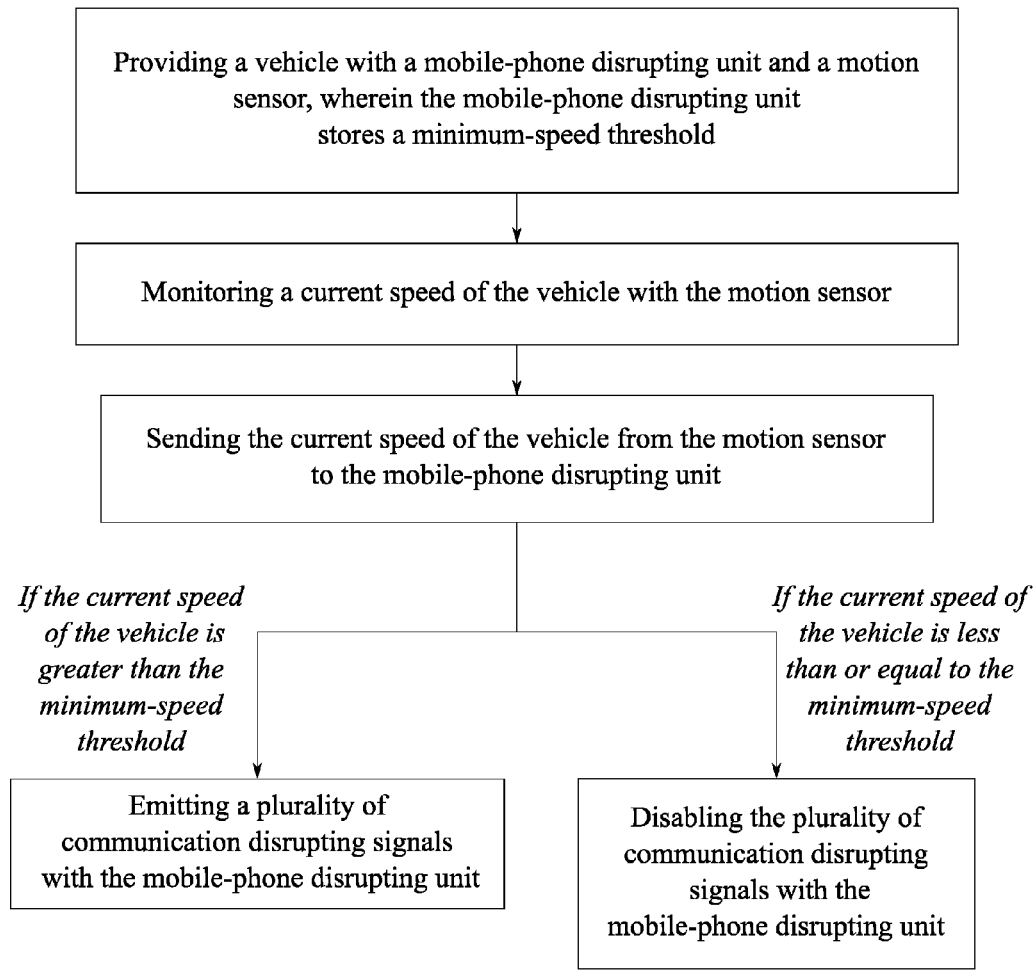
FIG. 1B is a flowchart illustrating the overall process of the present invention.

As shown in FIG. 1B, for the motion sensor to detect movement of the vehicle and disrupt wireless communication accordingly, the present invention monitors a current speed of the vehicle with the motion sensor. This allows the present invention to block wireless communication only when the vehicle is in motion or when the vehicle has reached a predetermined speed. In different embodiments of the present invention, the mobile-phone disrupting unit can be activated at different speeds by varying the minimum-speed threshold. The present invention sends the current speed from the motion sensor to the mobile-phone disrupting unit. If the current speed of the vehicle is greater than the minimum-speed threshold, the present invention activates the mobile-phone disrupting unit so that a plurality of communication disrupting signals is emitted. The plurality of communication disrupting signals is low-powered and is emitted within a small range sufficient to disrupt the wireless communication of a mobile device located within the vehicle. More specifically, the plurality of communication disrupting signals will identify and disrupts incoming and outgoing texts, incoming and outgoing calls, and other comparable communications. The plurality of communication disrupting signals being low-powered ensures that no health risk is present to a user of the present invention or other individuals in the vehicle. Since the wireless communication is intended to be interrupted only when the vehicle is in motion, the disrupting of wireless communication needs to be abandoned when the vehicle is not in motion. To do so, the present invention disables the plurality of communication of disrupting signals if the current speed of the vehicle is less than or equal to the minimum-speed threshold. As an example, consider the minimum-speed threshold to be 0 miles per hour (mph). Therefore, when the vehicle starts moving and the current speed exceeds 0 mph, the plurality of communication disrupting signals is emitted. When the vehicle is not in motion, and the current speed of the vehicle drops to 0 mph, the process of emitting the plurality of communication disrupting signals is disabled. In another embodiment of the present invention, the minimum-speed threshold can be 10 mph. In such instances, the plurality of communication disrupting signals is emitted when the current speed is greater than 10 mph. When the current speed of the vehicle drops to 10 mph or a speed less than 10 mph, the emitting of the plurality of communication disrupting signals is abandoned. The motion sensor is preferably mounted onto a wheel of the vehicle and is radially offset from a center axis of the wheel. However, the motion sensor can be mounted differently in other embodiments of the present invention.

As discussed earlier, the present invention can be integrated into the vehicle during the manufacturing process or as an aftermarket product. When the present invention is used as a retrofit, a self-containing enclosure is used so that the mobile-phone disrupting unit and the motion sensor can be housed within the self-containing enclosure. The self-containing enclosure allows the present invention to be positioned within the vehicle either as a visible component or a hidden component. When the self-containing enclosure is used, a portable power source is used to provide power to the mobile-phone disrupting unit and the motion sensor. The portable power source, which can vary in different embodiments of the present invention, is electrically connected to both the mobile-phone disrupting unit and the motion sensor and is then housed within the self-containing enclosure. The portable power source can be, but is not limited to, a battery, a solar power source or other comparable direct current source.

Contrary to being used as a retrofit, the mobile-phone disrupting unit and the motion sensor can also be operatively integrated into the vehicle. In such instances, a car battery of the vehicle is electrically connected to the mobile-phone disrupting unit and the motion sensor in order to power the mobile-phone disrupting unit and the motion sensor.

Figure 2:
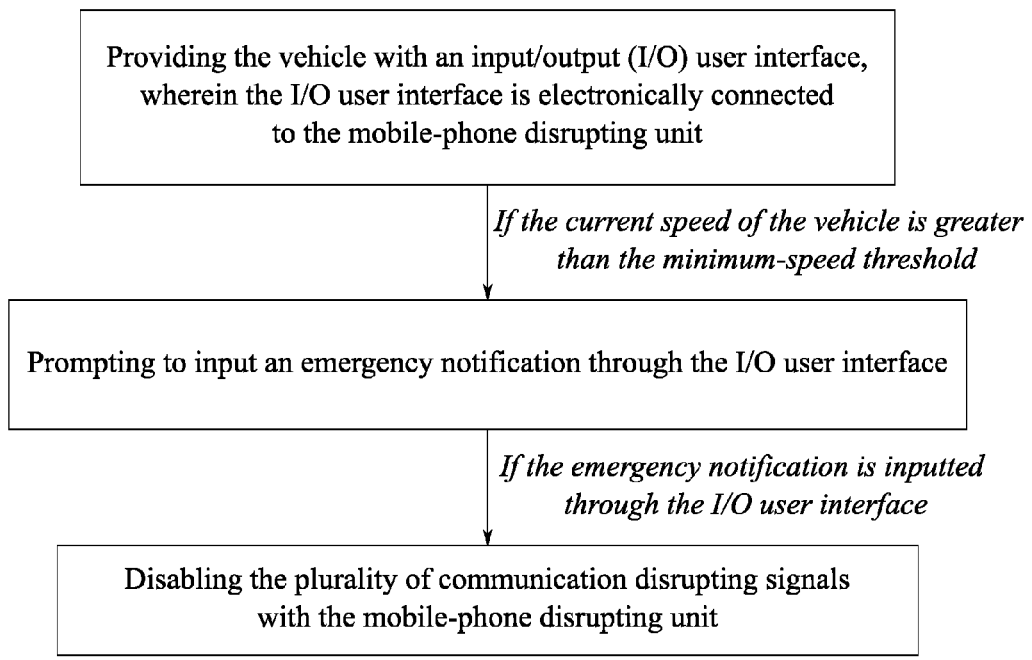
FIG. 2 is a flowchart illustrating the sub-process of using an input/output user interface.

Even though the present invention disrupts wireless communication of the mobile phone, the present invention also includes functionalities to execute emergency communication as shown in FIG. 2. To do so, the present invention is provided with an input/output (I/O) user interface which is electronically connected to the mobile-phone disrupting unit. The I/O user interface can be, but is not limited, to a display screen with a keypad or a touchscreen and would be activated when the vehicle is switched on or starts moving. However, the I/O interface can vary in different embodiments of the present invention. The present invention prompts the user to input an emergency notification through the I/O user interface even if the current speed of the vehicle is greater than the minimum-speed threshold. The emergency notification can be, but is not limited to, a car function failure. If the emergency notification is inputted through the I/O user interface, the present invention disables the plurality of communication disrupting signals with the mobile-phone disrupting unit so that the user can execute any necessary emergency communication.

Figure 3:
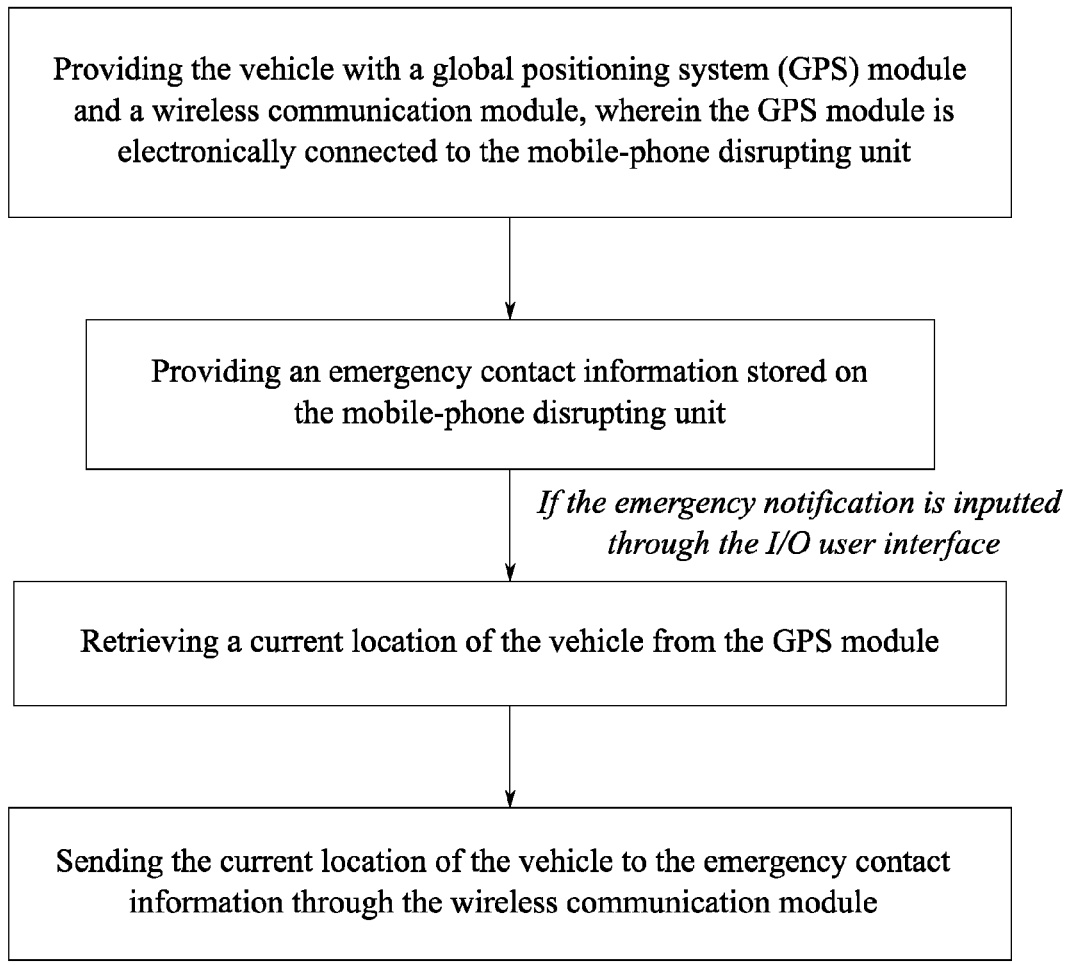
FIG. 3 is a flowchart illustrating the sub-process of using a global positioning system.

As shown in FIG. 3, the vehicle used in the present invention is provided with a global positioning system (GPS) module and a wireless communication module for location identification purposes during an emergency. The GPS module is electronically connected to the mobile-phone disrupting unit so that the location of the vehicle can be transferred during an emergency. More specifically, if an emergency occurs, and the emergency notification is inputted through the I/O user interface, a current location of the vehicle is retrieved from the GPS module and sent to an emergency contact information through the wireless communication module. To do so, the emergency contact information is stored on the mobile-phone disrupting unit. The emergency contact information can be, but is not limited to, an emergency medical contact or a parent of a teen who is utilizing the present invention.

Figure 4:
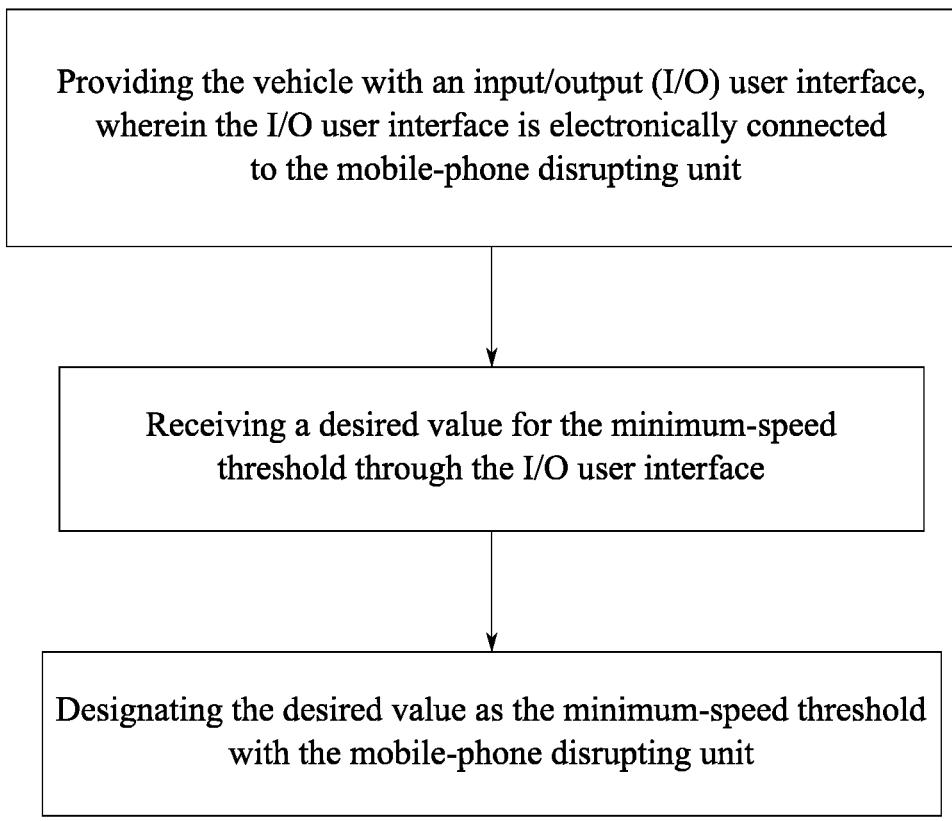
FIG. 4 is a flowchart illustrating the sub-process of setting a minimum-speed threshold with the input/output user interface.

As discussed earlier, the minimum-speed threshold can vary in different embodiments of the present invention. In one embodiment of the present invention, the minimum-speed threshold is a pre-defined value. Preferably, the pre-defined value is either 0 mph or other comparable low speed. In another embodiment of the present invention, a desired speed for the minimum-speed threshold is received through the I/O user interface. Upon receiving the desired value, the present invention designates the desired value as the minimum-speed threshold with the mobile-phone disrupting unit. The process of inputting the minimum-speed threshold through the I/O user interface is illustrated in FIG. 4.

In one embodiment, the present invention can be configured into a mobile device itself so that when the mobile device detects the vehicle in motion, the mobile device disables any of its own wireless communication that could distract the driver.

When the present invention is in use, the following process flow is generally followed. The mobile-phone disrupting unit and the motion sensor are operatively integrated into the vehicle or is made available as a retrofit within the self-containing enclosure. The current speed of the vehicle is monitored through the motion sensor. If the current speed is greater than the minimal-speed threshold, the mobile-phone disrupting unit is triggered. Next, the mobile-phone disrupting unit emits the plurality of communication disrupting signals so wireless communication of a mobile device inside the vehicle is disabled. When the current speed of the vehicle drops to the minimum-speed threshold, the mobile-phone disrupting unit disables the process of emitting the plurality of communication disrupting signals. If an emergency occurs, the user inputs the emergency notification through the I/O user interface so that the present invention proceeds to disable the plurality of communication disrupting signals. If the current location needs to be shared, the GPS module sends the current location of the vehicle to the emergency contact information.

Although the invention has been explained in relation to its preferred embodiment, it is to be understood that many other possible modifications and variations can be made without departing from the spirit and scope of the invention as hereinafter claimed.

What is claimed is:

1. A method for temporarily blocking incoming and outgoing wireless communication for a mobile phone comprises the steps of:

providing a vehicle with a mobile-phone disrupting unit and a motion sensor, wherein the mobile-phone disrupting unit stores a minimum-speed threshold;

monitoring a current speed of the vehicle with the motion sensor;

sending the current speed of the vehicle from the motion sensor to the mobile-phone disrupting unit;

emitting a plurality of communication disrupting signals with the mobile-phone disrupting unit, if the current speed of the vehicle is greater than the minimum-speed threshold;

disabling the plurality of communication disrupting signals with the mobile-phone disrupting unit, if the current speed of the vehicle is less than or equal to the minimum-speed threshold;

providing the vehicle with an input/output (I/O) user interface, wherein the I/O user interface is electronically connected to the mobile-phone disrupting unit;

receiving a desired value for the minimum-speed threshold through the I/O user interface; and designating the desired value as the minimum-speed threshold with the mobile-phone disrupting unit.

2. The method for temporarily blocking incoming and outgoing wireless communication for a mobile phone, the method as claimed in claim 1 comprises the steps of:
   providing a self-containing enclosure, wherein the mobile-phone disrupting unit and the motion sensor are housed within the self-containing enclosure; and
   positioning the self-containing enclosure within the vehicle.

3. The method for temporarily blocking incoming and outgoing wireless communication for a mobile phone, the method as claimed in claim 2, wherein a portable power source is electrically connected to the mobile-phone disrupting unit and the motion sensor and is housed within the self-containing enclosure.

4. The method for temporarily blocking incoming and outgoing wireless communication for a mobile phone, the method as claimed in claim 1, wherein the mobile-phone disrupting unit and the motion sensor are operatively integrated into the vehicle.

5. The method for temporarily blocking incoming and outgoing wireless communication for a mobile phone, the method as claimed in claim 4, wherein a car battery for the vehicle is electrically connected to the mobile-phone disrupting unit and the motion sensor.

6. The method for temporarily blocking incoming and outgoing wireless communication for a mobile phone, the method as claimed in claim 1 comprises the steps of:
   prompting to input an emergency notification through the I/O user interface,
   if the current speed of the vehicle is greater than the minimum-speed threshold; and
   disabling the plurality of communication disrupting signals with the mobile-phone disrupting unit,
   if the emergency notification is inputted through the I/O user interface.

7. The method for temporarily blocking incoming and outgoing wireless communication for a mobile phone, the method as claimed in claim 6 comprises the steps of:
   providing the vehicle with a global positioning system (GPS) module and a wireless communication module, wherein the GPS module is electronically connected to the mobile-phone disrupting unit;
   providing an emergency contact information stored on the mobile-phone disrupting unit;
   retrieving a current location of the vehicle from the GPS module,
   if the emergency notification is inputted through the I/O user interface; and
   sending the current location of the vehicle to the emergency contact information through the wireless communication module.

8. The method for temporarily blocking incoming and outgoing wireless communication for a mobile phone, the method as claimed in claim 1, wherein the minimum-speed threshold is a pre-defined value.

9. The method for temporarily blocking incoming and outgoing wireless communication for a mobile phone, the method as claimed in claim 1, wherein the mobile-phone disrupting unit is a radio frequency (RF) disruptor.

10. The method for temporarily blocking incoming and outgoing wireless communication for a mobile phone, the method as claimed in claim 1, wherein the motion sensor is mounted onto a wheel of the vehicle and is radially offset from a center axis of the wheel.

* * * * *